United States Patent [19]

Kulp, Jr.

[11] Patent Number: 4,798,506
[45] Date of Patent: Jan. 17, 1989

[54] APPARATUS FOR FORMING PRECISELY ARCUATE CUTS IN A WORKPIECE

[76] Inventor: Earl F. Kulp, Jr., 320 Lincoln St., Charlotte, N.C. 28203

[21] Appl. No.: 146,329

[22] Filed: Jan. 21, 1988

[51] Int. Cl.⁴ .............................................. B23C 1/20
[52] U.S. Cl. .................................... 409/179; 409/79; 144/144 R
[58] Field of Search .............. 409/179, 79; 144/144 R

[56] References Cited

U.S. PATENT DOCUMENTS 3,858,630 1/1975 Cherry et al. ...................... 409/79

Primary Examiner—Léon Scott, Jr.
Attorney, Agent, or Firm—Shefte, Pinckney & Sawyer

[57] ABSTRACT

A woodworking apparatus for forming arcuate and circular cuts in a workpiece, includes an elongate base on which an arm is slidably supported with a mounting plate at the outward end of the arm for supporting a router. The base has openings for affixation to a wood board or like workpiece using a woodscrew or similar fastener to define a rotational axis for unitary rotational movement of the base, arm, plate and router to form an arcuate or circular cut.

11 Claims, 2 Drawing Sheets

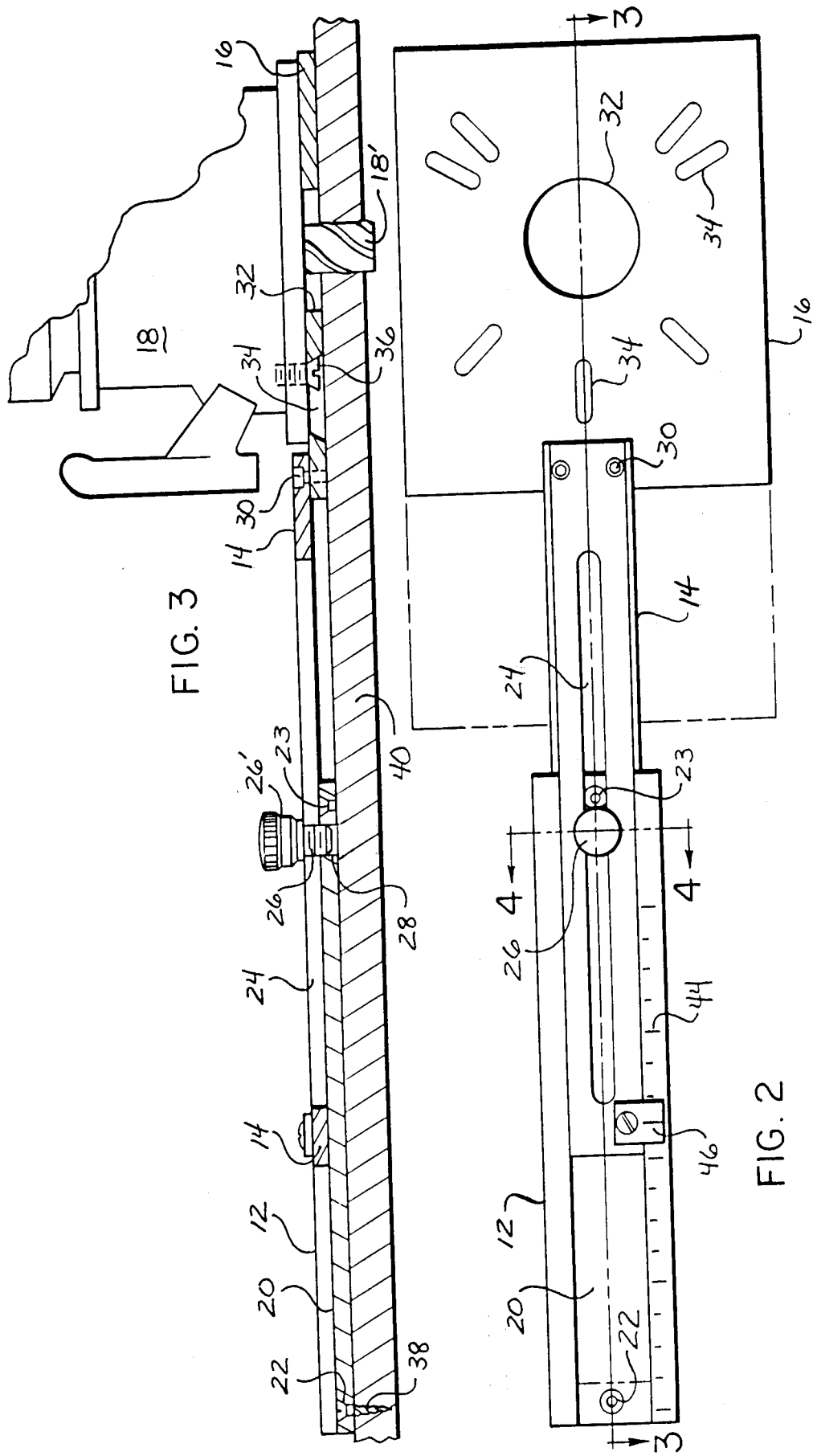

APPARATUS FOR FORMING PRECISELY ARCUATE CUTS IN A WORKPIECE

BACKGROUND OF THE INVENTION

The present invention relates to a cutting apparatus and, more particularly, to a woodworking apparatus particularly adapted for forming precise circular and arcuate cuts in wooden boards, planks and the like.

In the cabinet making, furniture making and similar woodworking arts, one of the more difficult woodworking operations to perform precisely is the formation of circular and arcuate cuts in a workpiece with a uniform radius throughout the full circular or arcuate extent of the cut. Of course, in the large-scale mass production of woodwork items, the manufacture of a precise jig or fixture for forming a desired circular or arcuate cut may be justified. However, for many woodworking operations, particularly for example, the custom manufacture of furniture and like made-to-order specialty items, the manufacture of a suitable jig or fixture is not cost-justifiable. In such cases, the formation of circular or arcuate cuts must be accomplished by the relatively crude procedure of drawing a circular or arcuate line in the workpiece to be cut and then cutting along the line by hand, which necessarily produces imprecise results even by the most skilled woodworker.

Various devices have heretofore been proposed to enable the formation of arcuate or circular cuts using conventional woodworking tools. One such device is disclosed in U.S. Pat. No. 4,244,253, as an attachment for a conventional band saw or a like cutting machine to enable the formation not only of circular and arcuate cuts but also elliptical, heart-shaped and various other shapes of cuts. Another such device is disclosed in Wing U.S. Pat. No. 3,716,085, as an attachment to a conventional router template for routing arcuate patterns. However, this device is disadvantageously of rather limited application in that it is not designed for forming arcuate cuts of greater than approximately 180°.

SUMMARY OF THE INVENTION

It is accordingly an object of the present invention to provide a simple and effective, yet inexpensive, device which is adapted for use with a conventional router, jigsaw, or similar hand-held woodwork cutting tool for forming precisely arcuate cuts of any desired arcuate degree up to a full 360° arcuate cut through a range of varying radii.

For this purpose, the present apparatus includes a base with an associated arrangement by which the base may be affixed rotatably to a workpiece centrally of a desired arcuate cut to be made therein to define an axis for rotational movement of the base with respect to the workpiece through a full 360° range of movement. An extensible arm is mounted to the base for unitary movement therewith rotationally about the axis and for selective movement relative to the base radially with respect to the axis. The apparatus also includes a mounting member affixed to the extensible arm for supporting a cutting tool in cutting relation to the workpiece to enable forming of an arcuate cut therein during rotational movement of the base.

As preferably embodied for woodworking applications, the base of the present apparatus is preferably elongated with a dovetail channel formed lengthwise along the base and with the arm being of a compatible dovetail configuration to be slidably received in the channel. Two or more openings are formed through the base at spacings along the channel for selective alternative use of the openings to rotatably receive a fastener for affixing the base rotatably to the workpiece to enable selective varying of the effective radial extent of the apparatus. To enable the arm to be releasably fixed to the base selectively at any desired radial disposition relative to the base within the range of available radial sliding movement of the arm, an elongate slot is formed through the arm along its radial extent and a set screw extends through the slot into threaded engagement with the base for selective clamping engagement of the arm fixedly against the base. Graduations may be formed on one of the base and the arm to indicate the effective radius of the apparatus at differing radial dispositions of the arm. Preferably, the mounting member is a plate formed with a plurality of openings to enable selective mounting thereon of any of various conventional routers, jigsaws and similar appropriate cutting tools.

DESCRIPTION OF THE PREFERRED EMBODIMENT

FIG. 2 is a top plan view of the woodworking apparatus of FIG. 1, without the router mounted thereon;

FIG. 3 is a lengthwise cross-sectional view of the present woodworking apparatus, taken along line 3—3 of FIG. 2.

DESCRIPTION OF THE PREFERRED EMBODIMENT

Figure 1:
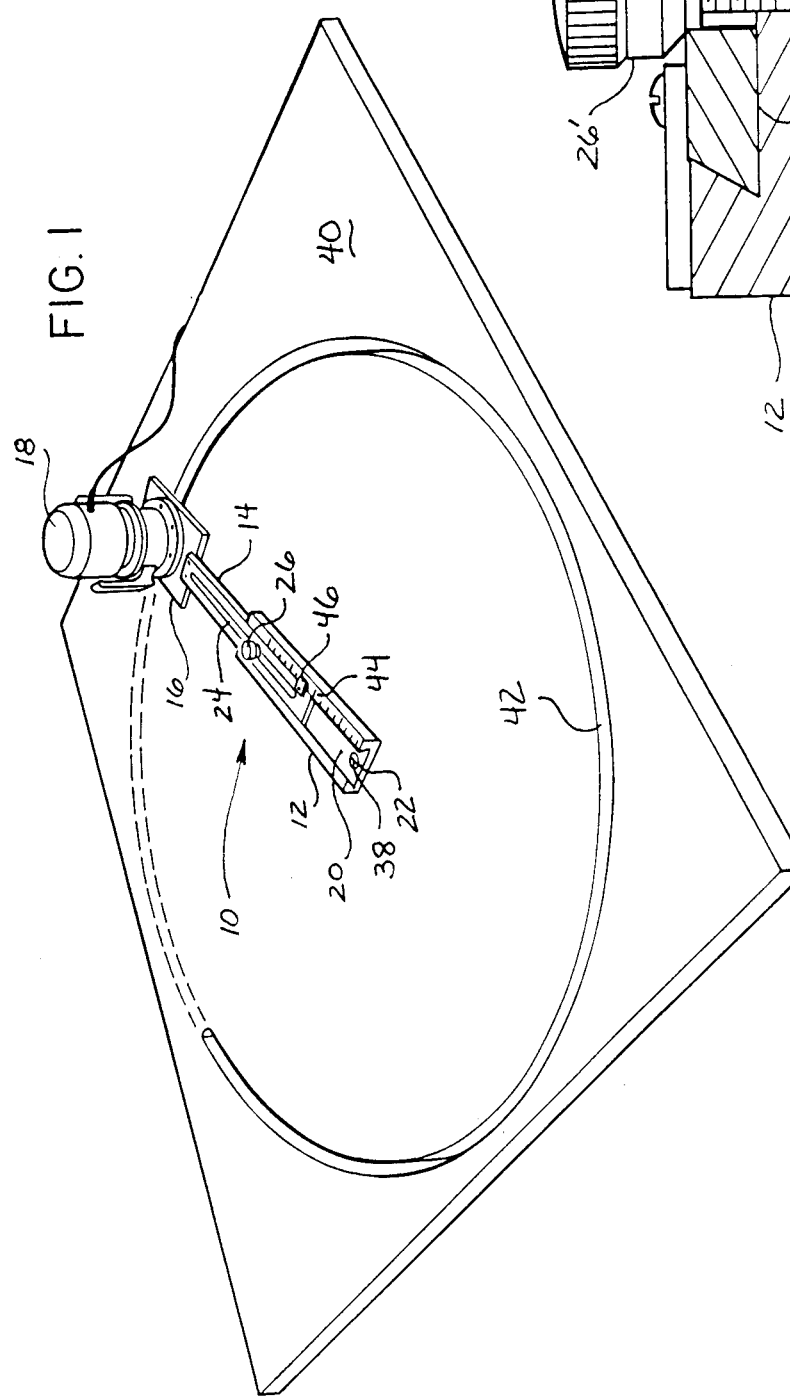
FIG. 1 is a perspective view of the preferred embodiment of the woodworking apparatus of the present invention in use with a conventional router for forming a full 360° circular cut in a wooden board.

Referring now to the accompanying drawings and initially to FIG. 1, the woodworking apparatus of the present invention is indicated generally at 10 and basically includes a base 12, an extensible arm 14 slidably mounted on the base and a mounting plate 16 affixed to the outwardly projecting end of the arm 14 for supporting a conventional router 18 or similar appropriate cutting tool.

Figure 4:
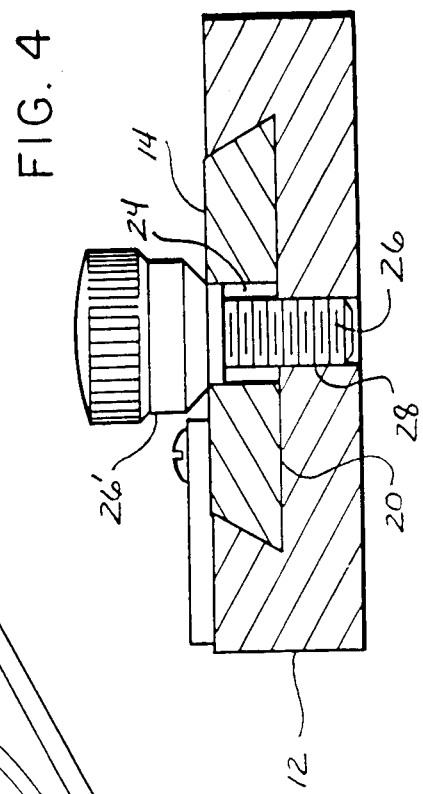
FIG. 4 is a transverse cross-sectional view of the present woodworking apparatus, taken along line 4—4 of FIG. 2.

As best seen in FIGS. 2-4, the base 12 is of an elongate rectangular configuration having a dovetail channel 20 formed in the upper face of the base 12 along the full longitudinal extent thereof. A pair of countersunk bores 22,23 are formed vertically through the base 12 along the longitudinal center line of the channel 20 at its opposite ends. The arm 14 is formed of an elongated dovetail configuration compatible to the channel 20 and is slidably received therein. In this manner, the arm 14 may be selectively extended and withdrawn with respect to the base 12, the dovetail connection therebetween serving to rigidify the arm 14 against lateral deflection relative to the base 12. An elongate slot 24 is formed through the arm 14 along a substantial extent of its length and a conventional thumbscrew 26 or similar set screw extends through the slot 24 into threaded engagement in a tapped opening 28 in the base for selective tightening movement of the head 26' of the thumbscrew 26 into and out of clamping engagement with the arm 14 laterally of its slot 24. In this manner, the slot 24 and thumbscrew 26 serve to define the available range of extension an withdrawal of the arm 14 relative to the base 12, with the thumbscrew 26 enabling the arm 14 to be releasably fixed with respect to the base 12 in any extended or withdrawn disposition relative thereto within the available range of arm movement.

The mounting plate 16 is of a substantially flat rectangular configuration and is affixed symmetrically to the projecting end of the arm 14 by a pair of machine screws 30. The mounting plate 16 has a central circular opening 32 formed therein for extension therethrough of the cutting bit 18' of the router 18. A plurality of elongated slots 34 are also formed through the mounting plate 16 at spacings radially outwardly from and circumferentially about the central opening 32, the slots 34 being selectively located to enable substantially any conventional brand of router to be mounted on the upper surface of the mounting plate 16 by suitable screws 36 when the bit 18' of the router 18 is positioned to extend downwardly through the central opening 32 in the mounting plate 16. In operation, the base 12 of the apparatus 10 is affixed to a workpiece 40, such as a wooden board, plank, sheet or the like, by extension of a woodscrew 38 or similar fastener through one of the countersunk bores 22,23 and into threaded engagement with the workpiece 40, as representatively shown in FIG. 1. In this manner, the base is affixed to the workpiece but is capable of rotation through a full 360° range of movement about an axis defined by the woodscrew 38. As will be understood, the location at which the woodscrew 38 is affixed to the workpiece 40 should be selected to be substantially centrally of the desired arcuate or circular extent of the cut to be made in the workpiece 40. As will also be understood, the appropriate one of the countersunk bores 22,23 selected for affixation of the base 12 to the workpiece 40 will depend on the desired radius of the circular or arcuate cut to be made. Upon proper affixation of the base 12 to the workpiece 40, the arm 14 is extended relative to the base 12 to precisely adjust the distance between the mounting woodscrew 38 and the router bit 18' to correspond to the desired radius for the cut to be made. For ease of such adjustment, the base 12 may be graduated along its length, as indicated at 44 and the arm 14 may be provided with a cooperative reference marker 46. When the radial extension of the arm 14 has been precisely adjusted in this manner, the thumbscrew 26 is tightened with respect to the base 12 to bring the screw head 26' into engagement with the upper surface of the arm 14 laterally adjacent its slot 24 to clampingly fix the arm 14 rigidly with respect to the base 12. Thereupon, the router 18 is actuated and the base 12, arm 14, mounting plate 16 and router 18 are rotated as a unit about the woodscrew 38 to progressively form an arcuate cut of any desired arcuate degree up to a full 360° circular cut, as represented by the cut 42 shown in process in FIG. 1.

As will thus be understood, the woodworking apparatus 10 of the present invention is of a simple construction which is inexpensive to manufacture and easy to operate. Furthermore, the woodworking apparatus 10 is particularly adapted for use with a conventional router 18, so as to be susceptible of broad scale use by woodworking professionals as well as hobbyists. Most importantly, the apparatus 10 enables a woodworker to precisely form uniform arcuate and circular cuts of a wide range of varying radii and through a full arcuate range up to 360°.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents therof.

I claim:

1. Apparatus for forming precisely arcuate cuts in a workpiece selectively of any desired arcuate degree up to a full 360° circular cut and of a range of varying radii, said apparatus comprising:

a base;

means for affixing said base rotatably to the workpiece centrally of a desired arcuate cut to be made in the workpiece to define an axis for rotational movement of said base with respect to the workpiece through a full 360° range of movement;

an extensible arm mounted to said base for unitary movement with said base rotationally about said axis and for selective movement relative to said base radially with respect to said axis; and mounting means affixed to said extensible arm for supporting a cutting tool in cutting relation to the workpiece for forming an arcuate cut in the workpiece during rotational movement of said base.

2. Apparatus according to claim 1 and characterized further in that said base has an opening formed therethrough for rotatably receiving a fastener for affixing said base rotatably to the workpiece.

3. Apparatus according to claim 2 and characterized further in that said base has at least two said openings formed therethrough at spacings along the radial extent of said base for varying the effective radial extent of said apparatus.

4. Apparatus according to claim 1 and characterized further in that said base and said extensible arm are formed of compatible dovetail configurations for sliding movability of said arm with respect to said base.

5. Apparatus according to claim 1 and characterized further by means for releasably fixing said arm to said base selectively at any desired radial disposition relative to said base within the range of available radial movement of said arm.

6. Apparatus according to claim 1 and characterized further by graduations formed on one of said base and said arm for indicating the effective radius of said apparatus at differing radial dispositions of said arm.

7. Woodworking apparatus for forming precisely arcuate cuts in wooden boards, planks and like workpieces selectively of any desired arcuate degree up to a full 360° circular cut and of a range of varying radii, said apparatus comprising:

a base having at least one opening formed therethrough for rotatably receiving a fastener for affixing said base rotatably to a workpiece centrally of a desired arcuate cut to be made in the workpiece to define an axis for rotational movement of said base with respect to the workpiece through a full 360° range of movement;

an extensible arm slidably mounted to said base for unitary movement with said base rotationally about said axis for selective movement relative to said base radially with respect to said axis;

means for releasably fixing said arm to said base selectively at any desired radial disposition relative to said base within the range of available radial sliding movement of aid arm; and mounting means affixed to said extensible arm for supporting a cutting tool in cutting relation to the workpiece for forming an arcuate cut in the workpiece during rotational movement of said base.

8. Woodworking apparatus according to claim 7 and characterized further in that said base is elongate with a dovetail channel formed lengthwise along said base, said base having at least two said openings formed therethrough respectively at spacings along said channel for selective alternative use of said openings to rotatably affix said base to the workpiece for varying the effective radial extent of said apparatus, and said arm being of a dovetail configuration compatible with said channel and being slidably received therein.

9. Woodworking apparatus according to claim 7 and characterized further in that said means for releasably fixing said arm to said base includes an elongate slot formed through said arm along its radial extent and a set screw extending through said slot and threadedly mounted to said base for selective movement into and out of clamping engagement of said arm fixedly against said base.

10. Woodworking apparatus according to claim 7 and characterized further by graduations formed on one of said base and said arm for indicating the effective radius of said apparatus at differing radial dispositions of said arm.

11. Woodworking apparatus according to claim 7 and characterized further in that said mounting means comprises a plate having a plurality of openings formed therein for selective mounting thereon of various conventional routers, jigsaws and like cutting tools.

* * * * *